US006556676B1

United States Patent
Buchanan et al.

(10) Patent No.: US 6,556,676 B1
(45) Date of Patent: Apr. 29, 2003

(54) ADAPTER CARD IMPLEMENTING A TIME-SHARED DIGITAL SIGNAL PROCESSOR

(75) Inventors: Chris R. Buchanan, Kanata (CA); Dick H. Keilty, Kanata (CA); Steven James Rhodes, Nepean (CA); Kevin MacNeill, Cochrane (CA); Richard Martin, Hull (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/350,931

(22) Filed: Jul. 12, 1999

(30) Foreign Application Priority Data

Jun. 7, 1999 (CA) .............................................. 2273660

(51) Int. Cl.[7] .............................................. H04M 1/00
(52) U.S. Cl. .............................. 379/399.01; 379/399.02
(58) Field of Search .......................... 379/93.01, 201.01, 379/406.06, 399.01, 399.02

(56) References Cited

U.S. PATENT DOCUMENTS 4,984,266 A * 1/1991 Smith .......................... 379/399
5,999,612 A * 12/1999 Dunn et al. .................. 379/212
6,397,182 B1 * 5/2002 Cruickshank et al. ........ 379/913

* cited by examiner

Primary Examiner—Creighton Smith

(57) ABSTRACT

The invention provides an adapter card for use with a computing apparatus executing in a multitasking environment program elements that implement call-related functional units requiring DSP (Digital Signal Processor) resources. In a specific example, the call-related functional units provide voice recognition services, IP (Internet Protocol) telephony and voice message, among others. The adapter card includes a switch that receives voice signals from one or more telephone lines physically connected to the adapter card. A digital signal processor is provided on the adapter card and can receive an audio signal from the switch for processing. When anyone of the call-related functional units needs access to the resources of the DSP, it issues a control signal to the switch that responds by directing the audio signal that is to be processed by the call-related functional unit to the digital signal processor. The results of the manipulations performed by the digital signal processor on the audio signal are then transferred to the call-related functional unit for further processing. The invention also provides a method and apparatus for processing calls implementing the above-functionality, and a digital signal processor featuring a switch capability coupled to a time-shared DSP resource.

38 Claims, 2 Drawing Sheets

ADAPTER CARD IMPLEMENTING A TIME-SHARED DIGITAL SIGNAL PROCESSOR

FIELD OF THE INVENTION

The present invention relates to telecommunications in general and more particularly to the processing of audio signals such as telephone audio signals. Specifically, the invention provides an adapter card featuring a time-shared DSP resource, for use with a computing apparatus that provides call-related functions. In a specific example, the call-related functions can be voice-recognition, voice messaging and IP telephony, among others. The invention also provides a method and apparatus for processing calls by time-sharing a DSP resource. The invention further provides a digital signal processor featuring a switch capability coupled to a time-shared DSP resource.

BACKGROUND OF THE INVENTION

Modern telephony brings to consumers a broad range of enhanced functions above the basic telephone service such as the ability to establish a communication link between two remote locations in a network. Specific examples of such enhanced call-related functions include voice recognition, IP telephony and voice messaging, automated call distribution, integrated voice response (talk-back to user) and text to speech conversion, among many others. The implementation of the enhanced call-related functions requires special manipulations of the audio signal on the line. A digital signal processor that is in the form of an integrated circuit capable of high-speed data processing is used to perform these manipulations. Normally, a single digital signal processor mounted on an adapter card installed in the telecommunication apparatus handling calls, such as a network switch or a PBX (Private Branch eXchange) is associated to a single call-related function and performs the audio signal processing when that call-related function is invoked. This form of implementation is not entirely satisfactory for cost reasons. The multiple adapter cards required for providing a wide range of enhanced services significantly increases the cost of the equipment.

In addition, multiple adapter cards increase the size of the telecommunication apparatus, which of course is undesirable. Also, upgrades on installed equipment are more difficult to implement. When a customer desired a new call-related function, he/she must purchase a new adapter card that often must be installed by a qualified technician. The installation is only possible if the telecommunication apparatus has free adapter card slots.

Therefore, there exists a need in the industry to provide systems capable to offering call-related functions at a lower cost than presently existing solutions and that make upgrades easier to implement.

SUMMARY OF THE INVENTION

In one aspect, the invention provides an adapter card for use with a computing apparatus capable of executing program elements for processing an audio signal and requiring a DSP resource. In a specific example, the program elements implement call-related functional units such IP telephony, voice recognition, and voice messaging, among others. The adapter card has a first interface for connection to at least one line carrying an audio signal and a switch that receives the audio signal from the interface and routes the signal toward a selected destination. A digital signal processor can receive an audio signal from the switch and perform desired manipulations on that audio signal. The digital signal processor provides time-shared services for the program elements executed by the computing apparatus.

The adapter card also has a second interface for connection to the computing apparatus. The switch is responsive to a control signal received from the second interface indicative of a request of a certain program element to gain access to a digital signal processor service, for directing an audio signal to the digital signal processor. The data issued by the digital signal processor as a result of the processing of the audio signal is made available to the program element for further processing.

In a specific example, the adapter card implements the functionality of a PBX (Private Branch eXchange) that enables users within an organisation to place calls to each other without going through the PSTN (Public Switch Telephone Network). In this form of implementation, the first interface receives a plurality of internal lines that connect to respective telephone sets. Also the interface receives one or more external lines connecting to the PSTN or to any other external network.

Under this specific example, the computing apparatus in which the adapter card is installed can be a server that executes the program elements implementing call-related functional units. When any one of those program elements executes to provide a certain call-related function, it will issue the necessary control signals to the switch on the adapter card such that the audio signal on which the function is to be performed will be directed to the digital signal processor. The latter manipulates the audio signal as required and transmits the results of manipulations to the program element for further processing. The digital signal processor is a time-shared recourse and in this specific example, a single digital signal processor is used to provide DSP services to a variety of call-related functional units.

In a different aspect the invention provides a call-processing apparatus comprising a line interface for connection to at least one line carrying an audio signal, a switch coupled to the interface and a digital signal processor capable to perform manipulations on the audio signal when the switch routes the audio signal to the digital signal processor. The call processing apparatus also comprises a plurality of call-related functional units for processing an audio signal at the line interface, the call-related functional units being capable of time-sharing the digital signal processor resource.

In yet another aspect, the invention provides a digital signal processor capable to perform core telephony functions and also providing time-shared DSP resources.

Other aspects and features of the present invention will become apparent to those ordinarily skilled in the art on review of the following description of specific embodiments of the invention in connection with the accompanying figures.

DETAILED DESCRIPTION

Figure 1:
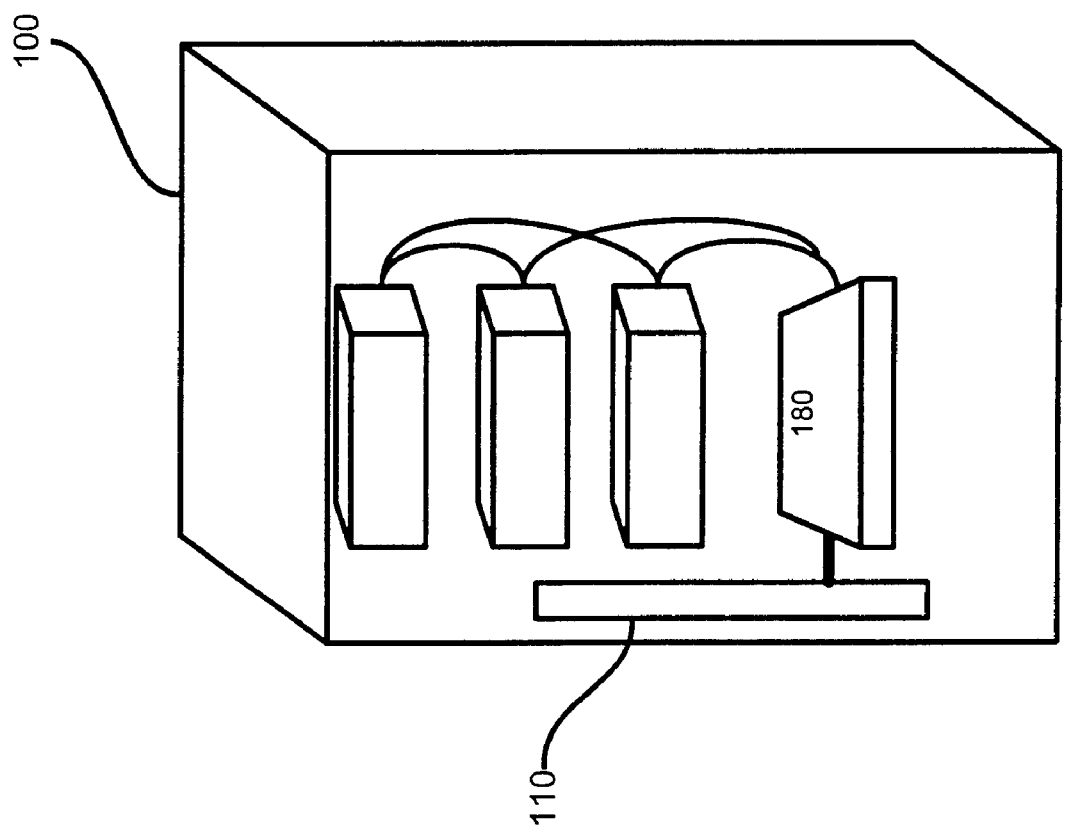
FIG. 1 is a schematic view of a computing apparatus showing the physical location of the adapter card in the computing apparatus cabinet, in accordance with the present invention.

With reference to the specific example of implementation of the invention depicted in FIG. 1, the device shown therein is a call processing apparatus 100 that includes two main components namely a computing apparatus in the form of a server and an adapter card 180 connected to the bus on the mother board 110 of server as it will be described in greater details later. In a specific example, the adapter card 180 is designed to plug in a free expansion slot on the motherboard to connect to the bus. FIG. 1 also illustrates a plurality of boxes above adapter card. These are shown for completion purposes and represent the usual components found in a server, such as power supply, hard drives, tape drives, floppy drives, etc. These components are not critical to the invention and for this purpose they will not be described in detail here.

Briefly stated, the adapter card 180 provides the core telephony functions and also a DSP resource to program elements executed by the server that provide call-related functions. Such DSP resource offers one or more DSP services, such as voice encoding, voice decoding, voice recognition, voice grooming (automatic gain control), tone detection, tone generation and so on.

Figure 2:
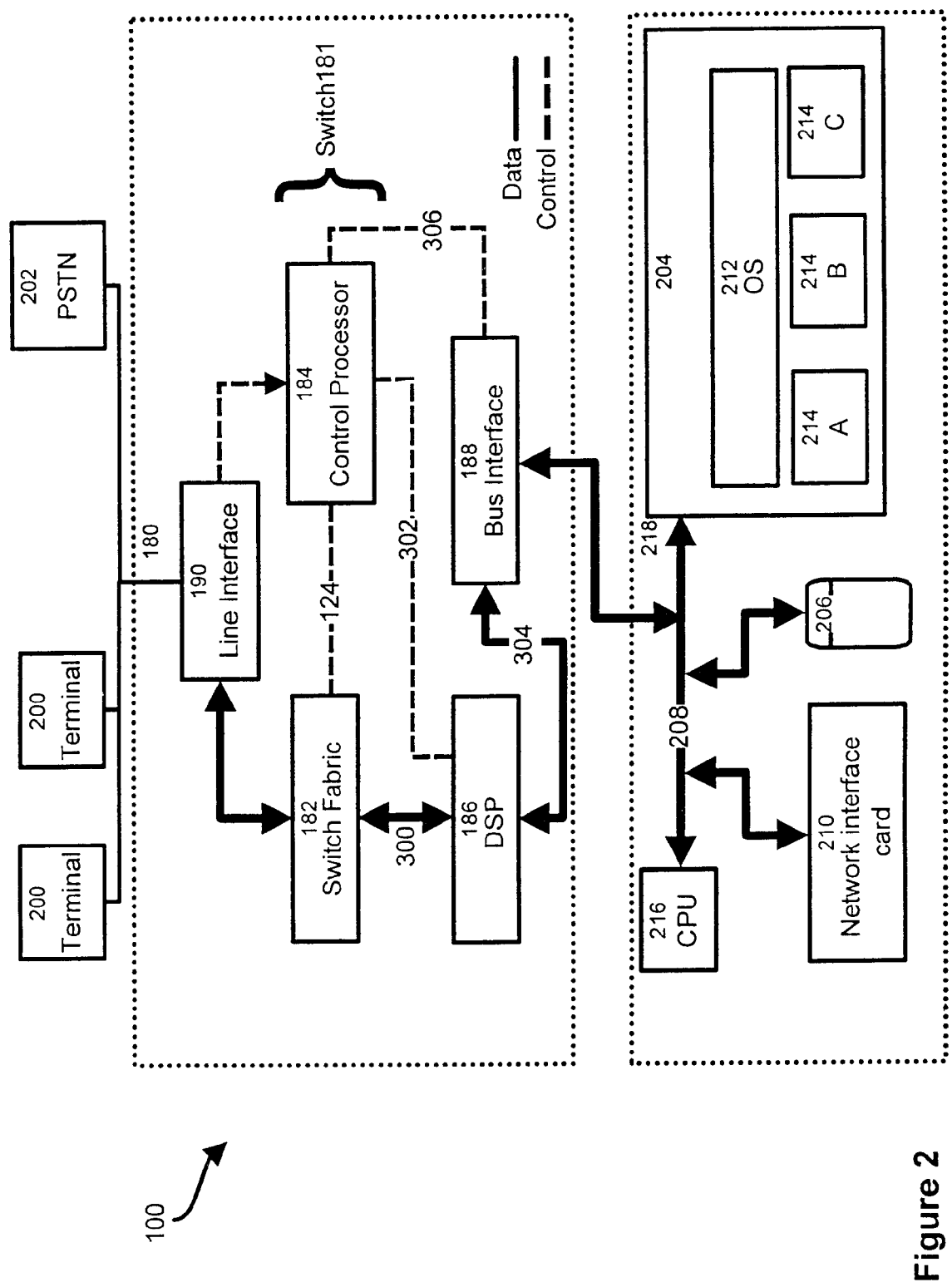
FIG. 2 is a block diagram partly functional and partly structural of the call processing apparatus illustrated in FIG. 1 (The block 180 has a key for the communication paths of the units in that block—full lines illustrate data links while dashed lines illustrate control signal links. This key holds only of the block 180 and does not apply elsewhere in the drawings).

FIG. 2 provides a block diagram of the call processing apparatus 100. The adapter card 180 includes four main components namely a line interface 190, a switch 181, a digital signal processor (DSP) 186 and a bus interface 188 connecting with the bus of the server.

The line interface 190 establishes the physical connection between internal telephone sets 200 and the external world, in this example the PSTN 202. In the example shown, the line interface 190 connects to two telephone sets 200 and to a single external line that leads to the PSTN 202. It will be plain to a person skilled in the art that the number of lines to which the line interface 190 can connect is a matter of design choice and it is not critical to the operation of the invention.

The line interface 190 provides a bi-directional transmission medium for voice signals that could be in digital or analog form and also control signals between the lines and the switch 181. The switch 181 is a component that provides core telephony functions such as basic call routing and the associated call handling (for instance managing the placement of a call on hold) necessary to allow users to place calls internally and externally. In a specific example of operation, when one telephone set 200 wishes to establish a connection with another telephone set 200, the switch 181 will establish a connection path between the two internal lines allowing the audio signal to travel between the two telephone sets 200. The same function can also be performed between an internal telephone set 200 and a terminal point within the PSTN 202.

The switch 181 has two main components, namely a control processor or simply controller 184 and a switch fabric 182. The controller 184 receives control signals, and implements the logic necessary to control the operation of the switch fabric 182 such as to provide the basic telephony functions. In addition it also incorporates logic to provide a level of control over the digital signal processor 186 that will be described later. The switch fabric 182 is merely a signal routing matrix that responds to control signals issued by the controller 184 over the control signal link 124 to direct a data signal such as an audio signal to the desired destination. In a specific example, the switch 181 is a timeswitch. Evidently, other types of switches can be used without departing from the spirit of the invention. It is not deemed necessary here to describe in further details the structure and the operation of the switch 181 since this component is well known to the person skilled in the art. In a specific example, a digital signal processing hardware chip can be used as a platform to build the switch 181.

The switch 181 connects to the digital signal processor 186 that is in the form of a hardware chip capable of high-speed manipulations on an audio signal. A digital signal processor that has been found satisfactory is the one manufactured by Motorola in the DSP56XXX family products. More particularly, the digital signal processor 186 connects to the switch fabric 182 to receive over the data link 300 the audio signal on which the high-speed manipulations are to be performed. The digital signal processor 186 also connects to the controller 184 via control signal link 302 to receive control information, in particular which service or function provided by the digital signal processor 186 is to be applied on the audio signal. More specifically, the controller 184 indicates to the digital signal processor 186 through control signals over the control signal link 302 the kind of processing to be done on the audio signal, either voice encoding, voice decoding, voice recognition, etc.

As it is well known to those skilled in the art, a digital signal processor is capable of high-speed, real time data manipulations. The digital signal processor can be programmed to effect a wide variety of different operations on an input signal, either digital or analog. The digital signal processor 186 used in the apparatus 100 is programmed to perform the offer the following services, among many other possibilities:

1. Voice encoding/decoding;
2. Voice recognition;
3. Automated call distribution;
4. Integrated voice response (talk-back to user);
5. Text to speech conversion.

The data generated by the digital signal processor 186 as a result of the DSP processing is communicated to the bus interface 188 over the data link 304. The bus interface 188 constitutes the point of contact between the adapter card 180 and the computing apparatus 218. In addition to data signals the bus interface also conveys control signals, in particular to and from the controller 184 over the control signal link 306.

The computing apparatus 218 is built on a general purpose computing platform and includes a CPU 216, a random access memory 204, a mass storage device 206 in the form of a hard-drive or flash memory, and a bus 208 interconnecting all these components and allowing data and control signals to be exchanged between them. Preferably, the bus is a PCI bus. A network interface adapter card 210 connects to the bus 208 and allows the computing apparatus to be connected to a network, such as a packet switched network, that can function according to different protocols. In this specific example, a packet switched network may be designed to operate under the Ethernet protocol, the TCP/IP protocol, token ring protocol or any other suitable type of protocol. The interface 188 of the adapter card 180 connects to the bus 208 and allows the exchange of control and data signal between the adapter card 180 and the computing apparatus 218.

The random access memory 204 holds in operation program elements that are executed by the CPU. The program elements fall in two categories namely an operating system 212 and a plurality of the call-related functional units that are executed by the CPU. The call-related functional units 214 provide call-related functions such as IP telephony, voice recognition, and voice messaging among others. In a prefer embodiment, the operating system is Windows NT (trademark) that allows the program elements 214 to run in a multitasking environment. This allows the program elements to execute in parallel and also allows several instances of the same program element to exist, each instance being associated to a different call being set up or in progress through the switch 181. Although the block 204 (random access memory) shows a number of call-related functional units 214 active, it is to be understood that the memory 204 only hold the program elements or portions thereof associated to the call-related functions that are currently active. When a certain function is to be activated, the code is copied from the mass storage device 206 into the random access memory 204 where the CPU 216 can execute it.

Several examples of operation of the apparatus 100 will now be described to illustrate its functionality.

The first example is a situation involving a telephone call between an internal set 200 and the PSTN 202 that requires voice recognition services allowing automatic dialling when the user utters the name of the party he or she wishes to call. The example assumes the call originates at an internal telephone set 200. As a first step, the user makes a request for access to an outside line that can be reached by depressing a button on the keypad of the telephone set 200. The switch 181 notes this event and starts observing the condition of the line in order to collect digits indicative of the telephone number to be dialled. Instead of entering the telephone number, the user enters on the keypad a code that indicates he or she wishes to invoke the voice recognition features. The key code is recognised by the switch controller 184 as being a special key code and a result, the switch issues over the control signal link 306 and then through the interface 188 a control signal to the computing apparatus 218 invoking the program element 214 that performs voice recognition services. If the program element 214 performing voice recognition services is not yet started, its execution begins or if it is started, a new instance is created to serve this particular call.

The first event during the execution of the voice recognition program element 214 is to deliver to the switch 184 a message that is played to the user to prompt the user to speak the name of the person with whom he or she wishes to establish the connection. In this example, the message is digitized and stored on the mass storage device 206. The voice recognition program element 214 then causes the audio file containing the message to be transmitted through the interface to the switch 181. The audio data is sent through the bus interface 188, over the digital link 306, is processed by the DSP 186, and then sent to the switch fabric 182 where it is directed to the telephone line so that the announcement will be played to the user. In one specific example, the audio file as delivered by the computing apparatus 218 is in a well-known encoded format. The processing of the digital signal processor 186 consists of decoding the encoded audio data into a format such that when the signal is impressed on the line the user hears the announcement.

The function of the switch controller 184 is to direct the digital signal processor 186 to perform the proper service on the audio signal (decoding) and also to set the audio path through the switch fabric 182 such that the audio data released from the digital signal processor 186 will be delivered to the proper line. The controller 184 accomplishes this task by issuing the necessary control signals over the control signal links 302 and 124. The controller 184 also exchanges control signals with the voice recognition services program element 214 over the control signal link 306 in order to synchronise the processing of the audio signal by the digital signal processor 186 and the ultimate disposition of the DSP processed signal (playing of the announcement) with the execution of the program element 214. In other words, the controller 184 makes available the DSP resource exactly when the program element 214 requires it.

After the announcement is played, the voice recognition program element 214 issues another control signal to the controller 184 indicating that it is now ready to receive data for processing. In response to this control signal the controller 184 issues locally control signals over the control signal links 124 and 302 such that the connection path of the audio signal is directed to the digital signal processor 186 and the latter is set to provide a voice recognition service. The user speaks the name of the person that he or she wishes to call and that audio signal is transmitted by the switch fabric 182 to the digital signal processor 186. Here, the digital signal processor 186 performs the core voice recognition service that is to convert the spoken utterance into a phonetic representation. That phonetic representation is then transferred to the computing apparatus 218 through the data link 304 and the bus interface 188 such that the voice recognition program element 214 can process it. This processing involves comparing the phonetic representation against a list of vocabulary items to find the best possible match. The vocabulary items represent a list of names or parties that the user has previously and that are associated to phone numbers, such as Mother, Office, Home, Jim, etc. When the best possible match is found, the telephone number associated to this entry is extracted. The list of vocabulary items against with a match can be performed and the associated telephone numbers are held in the mass storage device 206. The extracted telephone number is then communicated through the interface 188 to the switch 181. The latter then dials this number automatically to establish the connection through PSTN. The controller 184 performs this operation.

A second example will now be provided in which a voice message is stored on the computing apparatus 218. This example assumes that the call originates in the PSTN and it is directed to one of the telephone sets 200. When the telephone set is not being answered after a predetermined number of rings, the switch 184 issues a control signal causing activation of the voice message program element 214. The voice message program element 214 directs from the mass storage device 206, a file containing an encoded message that is played by the switch 184 on the line notifying the caller that he or she is entering into voice message. The playing of the announcement is performed in the same fashion as described earlier in connection with the voice recognition example. After the message is being played, the voice message program element 214 issues another control signal to the controller 184 and in response to this control signal the latter directs the audio path from the PSTN to the digital signal processor 186 and sets the digital signal processor 186 to perform a voice encoding service. The incoming audio data is then encoded into any suitable format and it is passed through the interface 188 for storage on the mass storage device 206 under the control of the voice message program element 214.

The third example illustrates a situation where the user on a telephone set 200 is desirous of establishing an IP telephone call. The user will enter the code on the keypad of the telephone set to notify the controller 184 that the call is an IP call. The controller 184 issues a control signal to the IP telephony program element 214 to activate it or if the latter has already been activated to generate a new instance of this program element. The program element then issues a control signal to the controller 184 that causes the latter to direct the audio stream to the digital signal processor 186 and set the digital signal processor 186 to encode the audio stream. The encoded frames are then passed to the computing apparatus 218. The IP telephony program element 214 will then transmit the frames as IP packets through the packet network adapter card 210. Here, this example assumes that the IP telephony program element has knowledge of the address where the packets need to be delivered in order to complete the telephone connection.

In the fourth example, three calls are underway at the same time, the first call requiring voice recognition functions, the second call requiring voice message functions and the third call requiring IP telephony functions. The particulars of each function are identical to the examples presented earlier. In order to implement these three functionalites at the same time the services of the digital signal processor 186 are time-shared. This implies that during a first time slice, the services of the digital signal processor 186 are allocated to the program elements 214 performing voice recognition services. For this first time slice the switch fabric 182 is set by the controller 184 to direct the audio stream from the line requiring voice recognition to the digital signal processor 186 and the latter is set to provide the voice recognition resource. For the second time slice, the switch fabric 182 is set by the controller 184 to direct the audio stream from the line requiring voice message to the digital signal processor 186 and the latter is set to provide the voice message service by encoding the audio stream. For the third time slice the switch fabric 182 is set by the controller 184 to direct the audio stream from the line requiring IP telephony to the digital signal processor 186 and the latter is set to provide the IP telephony service. This arrangement allows a single digital signal processor 186 to be efficiently used and service a plurality of the program elements providing call related functions or services. In the event the requirements of the program elements 214 exceed the capability in the single digital signal processor 186, a second digital signal processor 186 can be installed by using an adapter card coupled to the digital signal processor 186 to augment real time audio signal processing capability.

The example of the invention illustrated in FIG. 2 relies on two separate digital signal-processing chips to implement the functions provided by the switch 181 and the digital signal processor 186. It is possible to use a single digital signal-processing chip to implement both functions.

Although the present invention has been described in considerable detail with reference to certain preferred embodiments thereof, variations and refinements are possible without departing from the spirit of the invention as have been described throughout the document. Therefore, only the appended claims and their equivalents should limit the scope of the invention.

I claim:

1. An adapter card for use with a computing apparatus capable of executing program elements for processing an audio signal and requiring a DSP resource, said adapter card comprising:
    a) a first interface for connection to at least one line carrying an audio signal;
    b) a switch coupled to said interface, said switch being operative for receiving an audio signal from said first interface and routing the audio signal toward a selected destination;
    c) a digital signal processor coupled to said switch for processing the audio signal when the switch routes the audio signal to said digital signal processor, said digital signal processor being a time shared resource for the program elements executed by the computing apparatus;
    d) a second interface for connection to the computing apparatus permitting an exchange of data and control signals between the computing apparatus and said adapter card.

2. An adapter card as defined in claim 1, wherein said switch is responsive to a control signal received from said second interface indicative of a request of a certain program element to gain access to said digital signal processor, for directing an audio signal from said first interface to said digital signal processor for processing, data issued by said digital signal processor as a result of the processing of the audio signal being made available to the certain program element for further processing through said second interface.

3. An adapter card as define in claim 2, wherein said switch includes a controller and a switch fabric, said switch fabric being responsive to control signalsissued by said controller to direct an audio signal at said first interface toward the selected destination.

4. An adapter card as define in claim 3, wherein said interface is operative for connection to a plurality of lines carrying audio signals.

5. An adapter card as define in claim 4, wherein said digital signal processor is capable of providing a plurality of data processing services, said digital signal processor being responsive to a control signal from said controller to implement a selected data processing service to an audio signal directed to said digital signal processor by said switch fabric.

6. An adapter card as define in claim 5, wherein said controller is responsive to control signals from said second interface for:
    a) during a first time slice:
        i) causing said switch fabric to direct an audio signal from a first line connected to said first interface to said digital signal processor;
        ii) setting said digital signal processor to perform a first data processing service on the audio signal from the first line;
    b) during a second time slice:
        i) causing said switch fabric to direct an audio signal from a second line connected to said first interface to said digital signal processor;
        ii) setting said digital signal processor to perform a second data processing service on the audio signal from the second line.

7. An adapter card as defined in claim 3, wherein said switch is a time switch.

8. An adapter card as defined in claim 3, wherein said switch is operative to implement core telephony functions.

9. An adapter card as defined in claim 8, wherein said switch is part of a PBX system that includes a plurality of internal lines and at least one external line, said first interface being operative for connection to a plurality of the internal lines and to the at least one external line.

10. An adapter card as defined in claim 1, wherein said second interface is operative for connection to a bus of the computing apparatus.

11. An adapter card as defined in claim 1, wherein said digital signal processor is a hardware chip.

12. An adapter card as defined in claim 11, comprising a plurality of sockets for receiving a plurality of hardware chips providing DSP resources.

13. An adapter card for use with a computing apparatus capable of executing program elements for processing an audio signal and requiring a DSP resource, said adapter card comprising:

a) a first interface means for connection to at least one line carrying an audio signal;
b) a switch means coupled to said first interface means, said switch means being operative for receiving an audio signal from said first interface means and routing the audio signal toward a selected destination;
c) a digital signal processor means coupled to said switch means for processing the audio signal when the switch routes the audio signal to said digital signal processor means, said digital signal processor means being a time shared resource for the program elements executed by the computing apparatus;
d) a second interface means for connection to the computing apparatus permitting an exchange of data and control signals between the computing apparatus and said adapter card.

14. A call processing apparatus, comprising:
a) a line interface for connection to at least one line carrying an audio signal;
b) a switch coupled to said line interface, said switch being operative for receiving an audio signal from said line interface and routing the audio signal toward a selected destination;
c) digital signal processor coupled to said switch for processing the audio signal when the switch routes the audio signal to said digital signal processor;
d) a plurality of call-related functional units for processing audio signals at said line interface and requiring a DSP resource, said digital signal processor being a time-shared resource for said call-related functional units.

15. A call processing apparatus as defined in claim 14, wherein said switch is responsive to a control signal indicative of a request of a certain call-related functional unit to gain access to said digital signal processor, for directing an audio signal from said line interface to said digital signal processor for processing, data issued by said digital signal processor as a result of the processing of the audio signal being made available to the certain call-related functional unit for further processing.

16. A call processing apparatus as defined in claim 15, wherein said switch includes a controller and a switch fabric, said switch fabric being responsive to control signals issued by said controller to direct an audio signal at said line interface toward the selected destination.

17. A call processing apparatus as defined in claim 16, wherein said interface is operative for connection to a plurality of lines carrying audio signals.

18. A call processing apparatus as defined in claim 17, wherein said digital signal processor is capable of providing a plurality of data processing services, said digital signal processor being responsive to a control signal from said controller to implement a selected data processing service to an audio signal directed to said digital signal processor by said switch fabric.

19. A call processing apparatus as defined in claim 18, wherein said controller is operative to:
a) during a first time slice:
    i) causing said switch fabric to direct an audio signal from a first line connected to said line interface to said digital signal processor;
    ii) setting said digital signal processor to perform a first data processing service on the audio signal from the first line;
b) during a second time slice:
    i) causing said switch fabric to direct an audio signal from a second line connected to said line interface to said digital signal processor;
    ii) setting said digital signal processor to perform a second data processing service on the audio signal from the second line.

20. A call processing apparatus as defined in claim 19, wherein said call-related functional units operate in a multitasking environment.

21. A call processing apparatus as defined in claim 20, wherein during data generated by said digital signal processor during the first time slice is transmitted to a first one of said call-related functional units for further processing.

22. A call processing apparatus as defined in claim 21, wherein during data generated by said digital signal processor during the second time slice is transmitted to a second one of said call-related functional units for further processing.

23. A call processing apparatus as defined in claim 22, wherein the data processing service is selected from the group consisting of voice encoding/decoding and voice recognition.

24. A call processing apparatus as defined in claim 16, wherein said switch is a time switch.

25. A call processing apparatus as defined in claim 16, wherein said switch is operative to implement core telephony functions.

26. A call processing apparatus as defined in claim 16, wherein said switch is part of a PBX system that includes a plurality of internal lines and at least one external line, said line interface being operative for connection to a plurality of the internal lines and to the at least one external line.

27. A call processing apparatus as defined in claim 14, wherein said digital signal processor is a hardware chip.

28. An adapter card as defined in claim 11, comprising a plurality of sockets for receiving a plurality of hardware chips providing DSP resources.

29. A call processing apparatus as defined in claim 14, comprising a computing device including:
a) a central processing unit;
b) a memory
c) a bus connecting said memory to said central processing unit;
d) said memory including a plurality of program elements for execution by said central processing unit to implement said call-related functional units.

30. A call processing apparatus as defined in claim 29, comprising an output for connection to a network.

31. A call processing apparatus as defined in claim 30, wherein said network is a packet network.

32. A call processing apparatus as defined in claim 30, wherein one of said call-related functional units is an IP telephony functional unit.

33. A call processing apparatus as defined in claim 32, wherein said digital signal processor is operative for processing an audio signal received from said switch to generate encoded data, said IP telephony functional unit being capable of processing the encoded data to release the data in packets through said output.

34. A call processing apparatus as defined in claim 14, wherein one of said call-related functional units performs voice recognition.

35. A call processing apparatus as defined in claim 14, wherein one of said call-related functional units performs voice message functions.

36. A method for performing call processing, comprising:
a) executing program elements on a computer apparatus, the program elements implementing a plurality of call-related functions requiring a DSP resource;

b) permitting an exchange of data and control signals between said computer apparatus and a DSP resource;

c) allocating the DSP resource to said call-related functions in a time-shared fashion.

37. A digital signal processing chip implementing a switch capable of performing core telephony functions and a time shared DSP resource, said switch including a controller and a switch fabric being responsive to control signals issued by said controller to direct an audio signal associated to a call toward a selected destination.

38. A digital signal processing chip as defined in claim 37, wherein said controller is responsive to control signals for;

a) during a first time slice:
   i) causing said switch fabric to direct an audio signal associated to a first call to said DSP resource;
   ii) setting said DSP resource to perform a first data processing service on the audio signal associated to the first call;

b) during a second time slice:
   i) causing said switch fabric to direct an audio signal associated to a first call to said DSP resource;
   ii) insetting said DSP resource to perform a second data processing service on the audio signal associated to the first call.

\* \* \* \* \*